United States Patent

[11] 3,580,599

[72] Inventors John N. Dodgen;
Kenneth R. Johnson, Humboldt, Iowa
[21] Appl. No. 821,183
[22] Filed May 2, 1969
[45] Patented May 25, 1971
[73] Assignee Dodgen Industries, Inc.
Humboldt, Iowa

[54] JACK AND TIEDOWN SYSTEM FOR A VEHICLE MOUNTED CAMPER
10 Claims, 6 Drawing Figs.
[52] U.S. Cl. ................................................ 280/34,
214/515, 254/45, 296/23
[51] Int. Cl. ...................................................... B62d 21/14,
B60p 3/32
[50] Field of Search.......................................... 254/45;
214/515; 296/23; 280/34

[56] References Cited
UNITED STATES PATENTS
3,415,490 12/1968 Steele............................ 254/45

Primary Examiner—Othell M. Simpson
Assistant Examiner—David R. Melton
Attorney—Zarley, McKee & Thomte ABSTRACT: A jack and tiedown system for a vehicle mounted camper including a first pair of jacks secured to the lower front corners of the camper and a second pair of jacks secured to the rearward end of the camper. The front jacks are adapted to be lowered into ground engagement at times to support the front end of the camper while the rear jacks are adapted to be lowered to the ground to support the rearward end of the camper at times. The vehicle has a pair of brackets secured to its frame which extends outwardly therefrom at opposite sides thereof and which are adapted to have the lower ends of the first pair of jacks connected thereto to tiedown the camper to the vehicle when the jacks are not being used to support the camper. The rear jacks are pivotally connected to the camper and are positioned rearwardly of the camper mud flaps to prevent the flaps from flapping in the wind when the second pair of jacks are not being used to support the rearward ends of the camper.

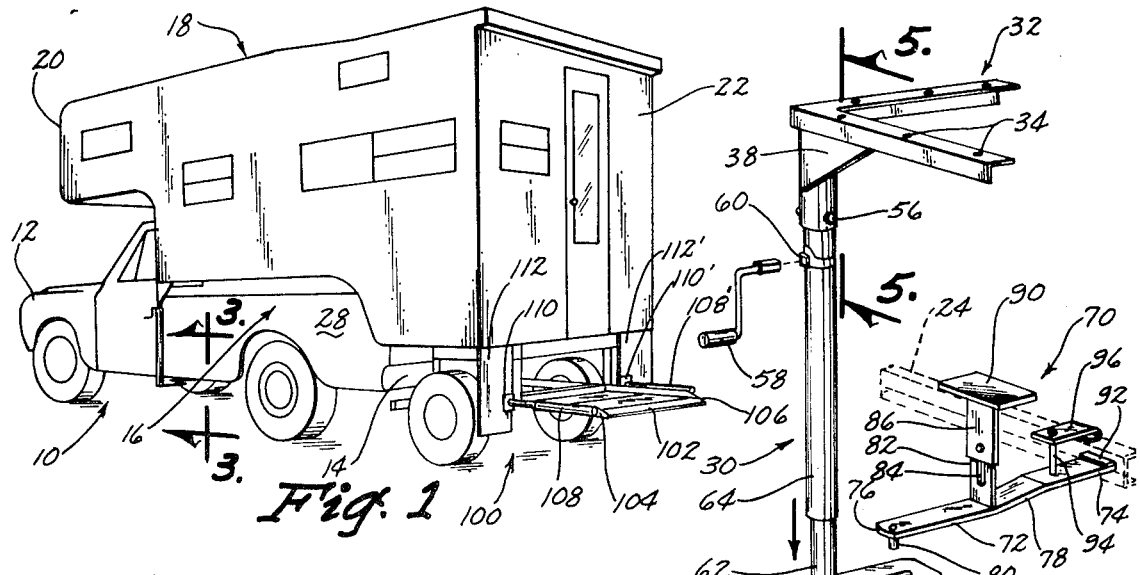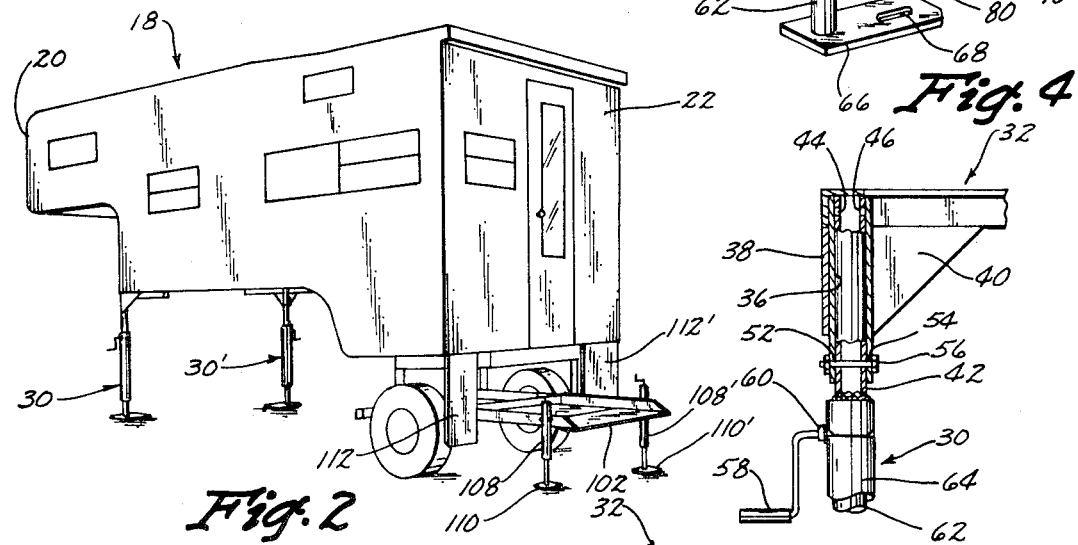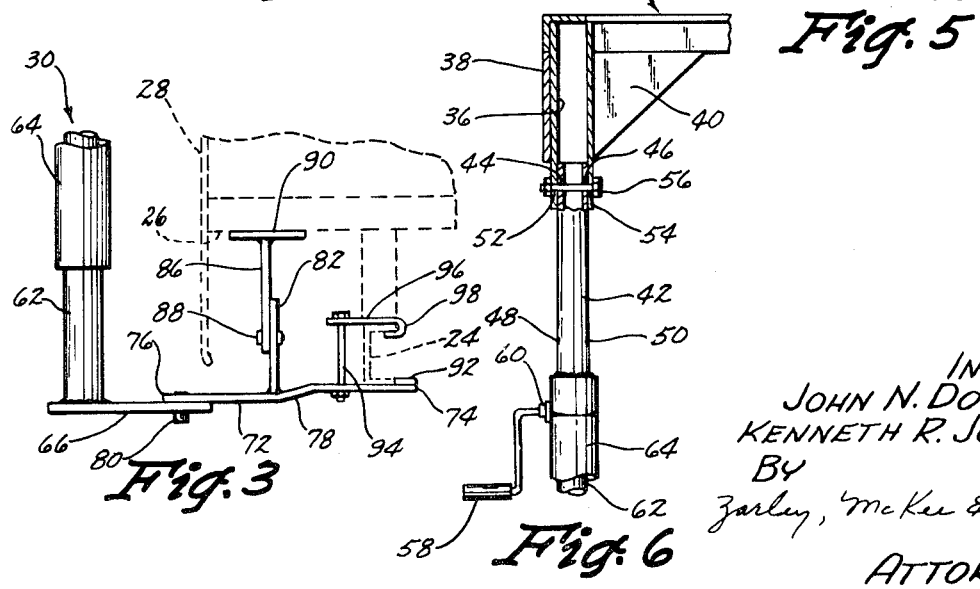

JACK AND TIEDOWN SYSTEM FOR A VEHICLE MOUNTED CAMPER

Conventional vehicle mounted campers usually have a front pair of jacks secured to the front portion of the camper and a rear pair of jacks secured to the rear end of the camper to support the camper when it is removed from the vehicle and to level the camper when it is being used while on the vehicle. These conventional jacks usually have tripod shoes or the like on the lower ends thereof which must be removed and stored when the vehicle is being driven. A separate tie down system is also needed in the conventional campers to secure the front part of the camper to the vehicle to prevent it from moving with respect to the vehicle when the vehicle is being used on the highway. It has been a common practice to extend a turnbuckle means between the vehicle body and the camper in an attempt to prevent the camper from moving with respect to the vehicle. The use of a turnbuckle means requires that holes be drilled in the vehicle body and camper and is unsatisfactory since the vehicle body has a tendency to bend or slightly move with respect to the vehicle frame. Thus, the camper still bobs, waves or moves on the vehicle due to wind action thereon and also when the vehicle strikes a bump due to the relative movement of the vehicle body with respect to the vehicle frame. Further, some campers have mud flaps mounted on the rear end thereof which objectionably flap as the vehicle is being driven.

Therefore, it is a principal object of this invention to provide a jack and tiedown system for a vehicle mounted camper.

A further object of this invention is to provide a jack and tiedown system for a vehicle mounted camper which prevents the camper from moving with respect to the vehicle frame.

A further object of this invention is to provide a jack and tiedown system for a vehicle mounted camper which provides a roll bar type of protection for the camper as well as a brace protection for the vehicle in case of collision or upset.

A further object of this invention is to provide a jack and tiedown system for a vehicle mounted camper which eliminates the need of bolting turnbuckles or clamps to the vehicle bed.

A further object of this invention is to provide a jack and tiedown system for a vehicle mounted camper which permits the camper to be easily levelled.

A further object of this invention is to provide a jack and tiedown system for a vehicle mounted camper which includes a fast drop assembly.

A further object of this invention is to provide a jack and tiedown system for a vehicle mounted camper which eliminates the necessity of removing tripod shoes from camper jacks when the vehicle is being transported.

A further object of this invention is to provide a jack and tiedown system for a vehicle mounted camper which prevents the camper mud flaps from flapping in the wind.

A further object of this invention is to provide a jack and tiedown system for a vehicle mounted camper which permits the camper to be quickly and easily removed from the vehicle.

A further object of this invention is to provide a jack and tiedown system for a vehicle mounted camper which is durable in use and refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a rear perspective view of a camper mounted on a vehicle with the apparatus of this invention secured thereto;

FIG. 2 is a view similar to FIG. 1 except that the camper has been removed from the vehicle;

FIG. 3 is a fragmentary view of the tiedown system used to secure a front jack to the vehicle frame;

FIG. 4 is a rear perspective view of the jack and tiedown system positioned at the opposite front corners of the camper;

FIG. 5 is an enlarged sectional view as seen along lines 5-5 of FIG. 4; and

FIG. 6 is a view similar to FIG. 5 and which illustrates the fast drop features of the front jacks.

The numeral 10 refers generally to a vehicle having a forward end 12 and a rearward end 14. Vehicle 10 is of the "pick up truck" type and has a bed 16 provided at the rearward end thereof adapted to receive a camper 18 thereon having a forward end 20 and a rearward end 22. Vehicle 10 includes a pair of longitudinally extending frame members, one of which is shown in FIGS. 3 and 4 and indicated by the reference numeral 24. Bed 16 includes a floor portion 26 which is positioned above the frame members. Bed 16 includes a side 28 having a lower end extending downwardly below floor 26 and it should be noted that the bed 16 has a side at the opposite side of the vehicle corresponding to side 28.

A pair of jacks 30 and 30' are secured to the camper 18 at the lower forward corners thereof as illustrated in FIG. 2. Inasmuch as jacks 30 and 30' are identical, only jack 30 will be described in detail with corresponding structure on jack 30' to be indicated by "'." Jack 30 includes an angle bracket 32 which is secured to the underside of the camper 18 at the lower left-hand corner thereof by bolts or the like extending through the openings 34 formed therein and through the camper. A tube 36 is secured to bracket 34 by welding or the like and extends vertically downwardly therefrom as best illustrated in FIGS. 5 and 6. A pair of reinforcing plates 38 and 40 are provided to add further strength and rigidity to the connection between the tube 36 and bracket 32. Tube 36 has a tube 42 slidably mounted therein as best illustrated in FIGS. 5 and 6. Tube 42 is provided with a pair of registering openings 44 and 46 adjacent the upper end thereof and a pair of registering openings 48 and 50 formed therein approximately 8 inches below the openings 44 and 46. Tube 36 is provided with a pair of openings 52 and 54 formed therein adjacent the lower end thereof which is adapted to receive a pin means 56 extending therethrough. The tube 42 can be raised or lowered with respect to the tube 36 and maintain in one of two positions by means of the pin means 56 extending through the openings 52, 44, 46 and 54 or through openings 52, 48, 50 and 54. The structure seen in FIGS. 5 and 6 may be referred as a fast-drop feature and permits the jack assembly to be raised or lowered approximately 8 inches without the necessity of cranking the screw mechanism provided therein. The actuating mechanism of jack 30 is conventional in structure and includes a crank handle 58 adapted to be inserted in a receptacle 60 to raise the lower leg 62 which slidably extends from the jack tubing 64, the upper end of which is secured to tube 42. A shoe 66 is secured to the lower end of leg 62 and extends inwardly therefrom as illustrated in FIGS. 3 and 4. Shoe 66 is provided with a slot 68 formed therein adjacent the inner end thereof. Thus, the rotation of crank handle 58 in one direction will cause the leg 62 to be moved downwardly with respect to tubing 64 to cause the shoe 66 to engage the ground to permit the front end of the camper to be supported on the ground and to permit the camper to also be levelled.

The numeral 70 generally refers to a tiedown bracket which is adjustably secured to frame member 24. A tiedown bracket identical to bracket 70 would also be secured to the frame member at the opposite side of the vehicle which would be used in conjunction with jack 30'. Bracket 70 includes an arm 72 having an inner end 74 and an outer end 76. As seen in FIG. 3, arm 72 is bent downwardly at 78 so that the outer end of the arm 72 is positioned below the inner end thereof. Arm 72 has a pin 80 secured thereto adjacent the outer end thereof by any convenient means such as welding or the like which is adapted to be received by the slot 68 as will be explained later. Arm 72 has an upstanding post 82 secured thereto and which has a vertically disposed slot 84 formed therein. A post 86 is vertically adjustably secured to the post 82 by means of a bolt 88 extending through an opening formed in the lower end of post 86 and through the slot 84. Post 86 has a plat 90 secured to the upper end thereof by welding or the like which abuts against the under side of the floor 26 of the bed 16. A small plate 92 is secured to the upper surface of arm 72 adjacent the inner end 74 by any means such as welding and is adapted to engage the lower inner end of the frame member 24 as best illustrated in FIG. 3. A bolt 94 extends through the clamp 96 and through the arm 72 to maintain the bracket 70 on the frame member in the manner illustrated in FIGS. 3 and 4. As seen in FIG. 3, clamp 96 has a arcuate portion 98 at the inner end thereof which extends over the upper inner end of the frame member 24. The clamp arrangement of the bracket permits the bracket 70 to be adjustable forward or backward on the truck frame to avoid any obstruction which might be attached to the truck frame. It is also adjustable so that the bracket 70 will correspond with the jack positioned adjacent thereby. The rotation of the crank handle 58 in a direction opposite to that previously described will cause the leg 62 to be raised into tubing 64 so that the pin 80 will be received by the slot 68 and so that the upper inner end of shoe 66 will engage the lower outer end of arm 62 to effectively tiedown the forward end of the camper to the vehicle frame. The plate 70 abuts against the under side of the floor 26 to prevent bending of the bracket 70. Thus, the jacks 30 and 30' may be lowered into ground engagement as illustrated in FIG. 2 so that the camper 18 may be supported on the ground rather than the vehicle. Additionally, the jacks 30 and 30' may be used to level the front portion of the camper 18 so that the refrigerator and other equipment in the camper will be level so as to operate properly. When the jacks 30 and 30' are raised to engage their respective mounting brackets, the camper is positively prevented from bobbing or waving since the frame moves with the vehicle as a unit so that the entire vehicle and camper absorb the bumps together rather than separately. Further, the jacks 30 and 30' when secured to their respective mounting brackets provide a roll bar type of protection for the camper as well as a brace protection for the vehicle in case of collision or upset. The tiedown system illustrated in the drawings eliminates the necessity of using turnbuckles or clamp arrangements which must be bolted onto the pickup bed. With the system disclosed herein, there are no holes to drill in the pickup bed and the frame mounting disclosed herein provides a much safer locking device than that previously possible. It can be appreciated that the design of the jacks 30 and 30' eliminates the necessity of removing the shoes from the jacks for storing thereof which is an objectionable characteristic of the previously designed campers.

Camper 18 is seen to include a rear wheel assembly 100 including a rearwardly extending step 102 having opposite sides 104 and 106. A jack assembly 108 is pivotally connected at its upper end to side 104 and a jack assembly 108' is pivotally connected at its upper end to side 106. The jacks 108 and 108' may be pivoted from the horizontal position seen in FIG. 1 to the vertical position seen in FIG. 2 so that the rear end of the camper may be ground supported and so that the camper may be levelled either on or off the vehicle. Additionally, when the jacks are pivoted to the horizontal stored position seen in FIG. 1, the shoes 110 and 110' provided on the lower ends thereof are positioned immediately rearwardly of the mud flaps 112 and 112' to prevent the flaps from objectionably flapping in the wind.

Thus it can be seen that a unique jack and tiedown system has been provided for a vehicle mounted camper which insures that the camper will be securely connected to the vehicle frame to prevent objectionable and undesirable movement thereof. Further, it can be seen that a unique system has been provided wherein the camper may be levelled either on or off the vehicle and which is highly stable in use. The system described herein is extremely convenient to operate and permits the camper to be quickly and easily removed from the vehicle or placed on the vehicle.

Thus it can be seen that the system accomplishes at least all of its stated objectives.

Some changes may be made in the construction and arrangement of our JACK AND TIEDOWN SYSTEM FOR A VEHICLE MOUNTED CAMPER without departing from the real spirit and purpose of our invention, and it is our intention to cover by our claims, any modified forms of structure or use of mechanical equivalents which may be reasonably included within their scope.

We claim:

1. In combination,
    a truck including a frame means having rearward and forward ends, a bed means operatively secured to said frame means and having opposite sides
    a camper means mounted on said bed means and including rearward and forward ends and opposite sides,
    a first jack means having upper and lower ends and being length adjustable from first to second positions, the upper end of said first jack means being secured to said camper means at one side thereof adjacent the forward end thereof,
    a first bracket means secured to said frame means and extending outwardly therefrom,
    means on the lower end of said first jack means adapted to engage said first bracket means when said first jack means is in its first position to prevent the forward end of said camper means from moving with respect to said bed means, a second jack means having upper and lower ends and being length adjustable from first to second positions, the upper end of said second jack means being secured to said camper means at the other side thereof adjacent the forward end thereof.
    a second bracket means secured to said frame means and extending outwardly therefrom,
    means on the lower end of said second jack means adapted to engage said second bracket means when said second jack means is in its first position to prevent the forward end of said camper means from moving with respect to said bed means,
    the lower ends of said first and second jack means adapted to engage the ground to support said camper means when said first and second jack means are moved to their said second positions.

2. The combination of claim 1 wherein said first and second bracket means are each comprised of an arm member secured to said frame means and extending outwardly therefrom, the lower end of the said jack means adapted to engage said arm member.

3. The combination of claim 2 wherein said first and second jack means each have a shoe secured to the lower end thereof extending inwardly towards the outer end of said arm member, said shoe having an opening formed therein adjacent its inner end, said arm members each having a pin means secured thereto extending downwardly therefrom adapted to be received by the said opening in said shoe of the respective jack means.

4. The combination of claim 3 wherein each of said arm members of said brackets have a post means secured thereto extending upwardly therefrom which engages the underside of said bed means to limit the upper movement of the arm member with respect to said frame means.

5. The combination of claim 4 wherein said post means is length adjustable.

6. The combination of claim 4 wherein said frame means includes a first and second longitudinally extending frame members, said arm members of said first and second bracket means being longitudinally adjustably secured to said first and second frame members.

7. The combination of claim 1 wherein each of said first and second jack means includes a first hollow tube secured to said camper means, a second tube slidably received in said first tube, said second tube having upper and lower pairs of bolt openings extending therethrough, said first tube having a first pair of bolt openings formed therein, said second tube being selectively vertically positioned in said first tube by a bolt means extending through said first pair of bolt openings in said first tube and through one of the pairs of bolt openings in said second tube.

8. The combination of claim 1 wherein said camper means includes a rearwardly extending step means at the rearward end thereof, third and fourth jack means secured to said step means and being movable from first to second positions said third and fourth jack means adapted to engage the ground to support said camper when moved to their said first positions.

9. The combination of claim 8 wherein said camper means includes an auxiliary wheel means positioned forwardly of said step means and a flexible flap means extending downwardly behind said wheel means, said third and fourth jack means having one end thereof positioned behind said flap means when moved to their second positions to prevent said flap means from moving rearwardly.

10. The combination of claim 8 wherein said first, second, third, and fourth jack means are movable to their ground engaging positions while said camper means is on said vehicle to level said camper means.